United States Patent
Theoduloz et al.

(10) Patent No.: US 9,063,865 B2
(45) Date of Patent: Jun. 23, 2015

(54) PROCESSOR CIRCUIT WITH SHARED MEMORY AND BUFFER SYSTEM

(75) Inventors: Yves Theoduloz, Yverdon (CH); Hugo Jaeggi, Fontaines (CH); Tomas Toth, Komarno (CH)

(73) Assignee: EM MICROELECTRONIC-MARIN SA, Marin (CH)

( * ) Notice: Subject to any disclaimer, the term of this patent is extended or adjusted under 35 U.S.C. 154(b) by 923 days.

(21) Appl. No.: 13/055,635

(22) PCT Filed: Jul. 23, 2009

(86) PCT No.: PCT/EP2009/059523
§ 371 (c)(1),
(2), (4) Date: Apr. 11, 2011

(87) PCT Pub. No.: WO2010/010163
PCT Pub. Date: Jan. 28, 2010

(65) Prior Publication Data
US 2011/0185127 A1    Jul. 28, 2011

(30) Foreign Application Priority Data
Jul. 25, 2008 (CH) ........................ 1178/08

(51) Int. Cl.
*G06F 12/08* (2006.01)

(52) U.S. Cl.
CPC .... *G06F 12/0897* (2013.01); *G06F 2212/1016* (2013.01); *G06F 2212/1044* (2013.01); *Y02B 60/1225* (2013.01)

(58) Field of Classification Search
CPC ...... G06F 12/00; G06F 12/08; G06F 12/0853
USPC .................. 711/100, 117, 118, 129, 154, 200
See application file for complete search history.

(56) References Cited

U.S. PATENT DOCUMENTS

| | | | |
|---|---|---|---|
| 6,247,084 B1 * | 6/2001 | Apostol et al. ................ | 710/108 |
| 7,181,572 B2 * | 2/2007 | Walmsley ..................... | 711/128 |
| 2005/0010726 A1 | 1/2005 | Rai et al. | |
| 2008/0016282 A1 | 1/2008 | Sakamoto | |
| 2009/0172296 A1 * | 7/2009 | Tsuji et al. .................... | 711/143 |

* cited by examiner

*Primary Examiner* — Tuan Thai
(74) *Attorney, Agent, or Firm* — Sughrue Mion, PLLC

(57) ABSTRACT

The processor circuit (1) has a Harvard architecture. This processor circuit includes a calculation unit (2), a first memory element (3a) for data storage and a second memory element (4a) for instruction storage. Said first and second memory elements (3a, 4a) are connected by at least one communication bus (5, 6) to the calculation unit. The processor circuit includes management means (8), placed between the first and second memory elements and the calculation unit and capable of saving several data items or instructions to save time during successive data reading.

8 Claims, 2 Drawing Sheets

PROCESSOR CIRCUIT WITH SHARED MEMORY AND BUFFER SYSTEM

This is a National Phase Application in the United States of International Patent Application PCT/EP2009/059523 filed Jul. 23, 2009, which claims priority on Swiss Patent Application No. 01178/08 of Jul. 25, 2008. The entire disclosures of the above patent applications are hereby incorporated by reference.

The present invention generally concerns a processor circuit. This processor circuit includes a calculation unit, a first memory element for data storage and a second memory element for instruction storage. Said first and second memory elements are connected by at least one communication bus to the calculation unit.

BACKGROUND OF THE INVENTION

Harvard type processor circuits are known in the prior art and are shown in FIG. 1. This Harvard architecture allows the processor circuit increased rapidity because instructions and data can be accessed at the same time. Processor circuits 1 having this architecture take the form of a calculation unit 2 communicating with two distinct memory units 3, 4. The first of the memory units 4 is used for storing instructions, while the second memory unit 3 is used for data storage. Each memory unit 3, 4 communicates with calculation unit 2 via a respective communication bus 5, 6. This architecture is thus characterized by the separation of data and instructions.

However, this type of architecture has some drawbacks. In fact, the architecture imposes two physically distinct memory units thereby increasing the surface area dedicated to said memory units and thus the surface area of the integrated processor circuit.

Moreover, this type of architecture with two separate memory units is not flexible to use. Indeed, even if it is possible to adapt the size of the two memory units in accordance with the use that will be made thereof, this adjustment requires physical alteration of the size of the two memory units. This alteration involves additional costs due to the need to perform design work on the actual component.

US Patent No 2002/0184465, which discloses a processor circuit using a similar architecture to the Harvard architecture, is also known in the prior art. This processor circuit is devised to have the processing speed advantages of the Harvard architecture. The processor circuit disclosed in US Patent No 2002/0184465 includes an architecture wherein the memory zone containing the instructions is also capable of storing data. However, this architecture still has two distinct memory units, one for instructions and one for data. The possibility of storing data in the memory unit that contains instructions allows some flexibility of use.

However, this processor circuit still has two distinct memory units with a large surface area which does not resolve the surface area problem of the Harvard architecture. Moreover, another drawback of this processor circuit is that it has flexibility of use resulting from a modification of the conventional Harvard architecture. Indeed, the processor circuit discloses a conventional Harvard architecture which still has two distinct memory units each communicating with the calculation unit via a communication bus. However, this architecture is altered in that the data bus is connected both to the data memory and to the programme memory. Thus, the flexibility provided by the processor circuit requires a profound alteration to the processor circuit and thus involves non negligible development costs.

Further, one of the drawbacks of storing data in the programme memory arises from the difference in size between data and instructions. It is generally observed that instructions are encoded in a larger number of bits than data. Thus, since the programme memory is divided into memory sections of the same size as that of the instructions, it may happen that several data items are stored in the same memory section. In read mode, the entire memory section is taken to be read. Thus when data stored in the instruction memory is read, only one part of the section is read which wastes time if successive data is read.

SUMMARY OF THE INVENTION

It is one of the main objects of the invention to overcome the aforementioned drawbacks of the prior art, namely by providing a Harvard architecture processor circuit which is flexible to use, has a smaller surface area and which also does not waste time when successive data is read, without said architecture being modified.

The invention therefore concerns the aforecited exclusively Harvard architecture processor circuit, characterized in that said processor circuit includes management means, placed between the first and second memory elements and the calculation unit and capable of saving several data items or instructions to save time when successive data is read, and in that the management means includes buffer memory means for storing several data items, said buffer memory means including an address comparator for detecting whether the address of a memory section to be read is the same as the one previously read in order to read the buffer memory directly and save time.

Advantageous embodiments of the processor circuit form the subject of the dependent claims 2 to 7.

One advantage of the processor circuit is the possibility of saving time when successive data is read. Indeed, the management means for managing communications between the shared memory unit and the calculation unit are capable of saving the entire read memory section. This capacity allows the data of said saved section to be read directly from the management means if the other data stored in the section has to be read during the next read operation.

A second advantage of the processor circuit according to the invention is that it has a smaller surface area than that of a Harvard architecture according to the prior art. The use of a shared memory allows the processor circuit according to this invention to have only one physical memory to contain both data and instructions, thereby saving space. Thus for the same storage volume, a shared memory has a smaller surface area than two distinct memory units. This difference in surface area is due to the fact that, for the two distinct memory units, everything is doubled, such as the monitoring and control members, whereas for a shared memory, i.e. a single memory unit there is only one of each of these elements.

Another advantage is the flexibility of use of the shared memory. The fact of having a single memory unit allows more flexibility in the allocation of memory volume. This flexibility is a consequence of grouping data and instructions within the same physical unit. A virtual separation can easily be made and adapted to allocate more or less memory volume to data or instructions.

BRIEF DESCRIPTION OF THE DRAWINGS

The objects, advantages and features of the processor circuit will appear more clearly upon reading the following detailed description of at least one embodiment of the invention, given solely by way of non-limiting example and illustrated in the annexed drawings, in which.

DETAILED DESCRIPTION OF THE INVENTION

In the following description, all those parts of the processor circuit which are well known to those skilled in the art in this technical field are only explained in a simplified manner.

Figure 1:
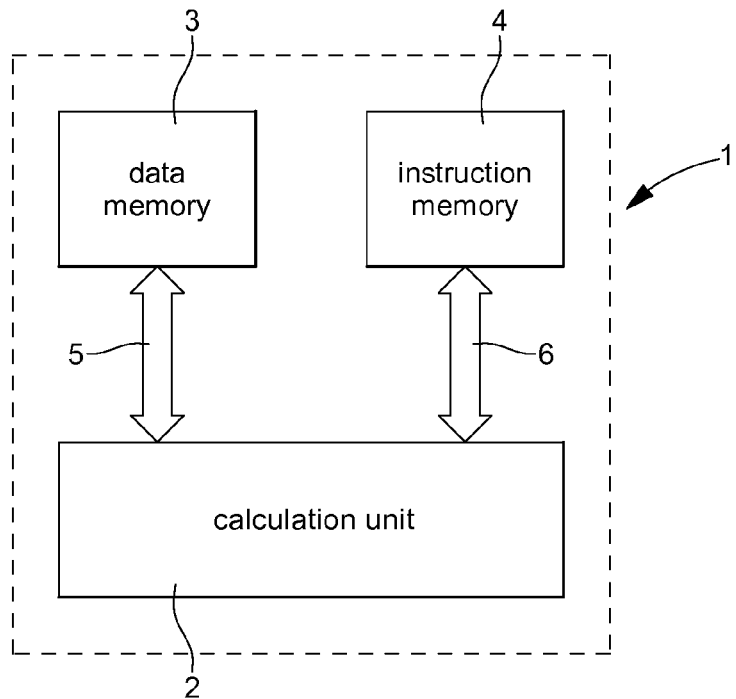
FIG. 1, already cited, shows schematically the processor circuit according to the prior art.
Figure 2:
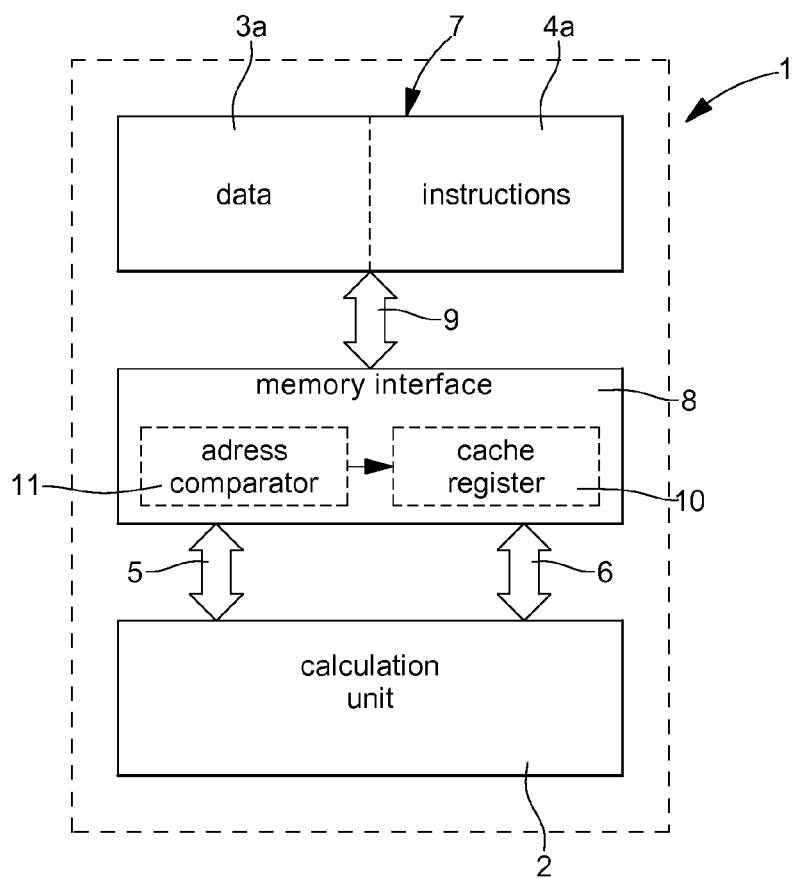
FIG. 2 shows schematically the processor circuit according to this invention.

FIG. 2 shows schematically a processor circuit 1 having a Harvard architecture in accordance with this invention. This processor circuit 1 thus includes a calculation unit 2 and two memory elements 3a and 4a; one 3a containing data and the other, 4a, instructions. Calculation unit 2, also called an arithmetic and logic unit, is used for carrying out the basic operations, said unit 2 being the core of said processor unit. Calculation unit 2 communicates with memory elements 3a, 4a via respective communication buses 5, 6. These communication buses 5, 6 respectively connect said calculation unit 2 to memory element 3a containing data, and said calculation unit 2 to memory element 4a containing instructions and are respectively called the data bus 5 and programme bus 6. Communication means 5, 6 further include management means 8 for managing communications between the shared memory 7 and calculation unit 2. These management means 8 take the form of a memory interface 8 located between shared memory 7 and calculation unit 2. Interface 8 is, on the one hand, connected to shared memory 7 by a communication bus 9, called the memory bus, and on the other hand, connected to calculation unit 2 by programme bus 6 and data bus 5. Memory interface 8 includes buffer memory means 10, 11 used for saving data to make it quicker to read successive data.

In order to increase flexibility and decrease the surface area of the processor circuit, it is possible to join the two memory elements 3a, 4a in a single physical unit to form a single memory unit 7, thus forming the shared memory. This memory is called a "shared memory" since it contains both data and instructions. Preferably, memory elements 3a, 4a are grouped together, thus forming two distinct areas. This arrangement advantageously facilitates programming, since the data and instructions are not mixed.

Moreover, this separation allows more flexibility of use. Since the data and instructions are grouped together, the space dedicated thereto can be optimised in accordance with the application. Indeed, the zones containing the data and instructions can be considered to be separated by a virtual limit that can easily be adapted. Thus, if an application of processor circuit 1 requires few instructions but an enormous amount of space for saving data, then this virtual limit can be moved to allow storage of a larger number of data. Conversely, if the application of processor unit 1 requires a large number of instructions but little data, then the virtual limit will be moved to allocate a larger space for the instructions. This flexibility of use is all the more appreciated as it is easier to move a purely software virtual limit than to physically optimise the size of memories 3a, 4a as is the case for unshared memories.

Memory interface 8 is used to manage communications between shared memory 7 and calculation unit 2. The operation of this interface consists in receiving read orders from calculation unit 2 for given memory addresses. Then memory interface 8 interprets these orders and goes to look for the data or instructions at the corresponding memory addresses. Once these addresses have been targeted, interface 8 recovers the data or instructions contained therein and sends the result to calculation unit 2 so that the latter can process them.

One characteristic of the shared memory is that the data and instructions are not encoded in the same number of bits. Instructions are coded in 16 or 32 bits, while data is generally coded in 8 bits.

Figure 3:
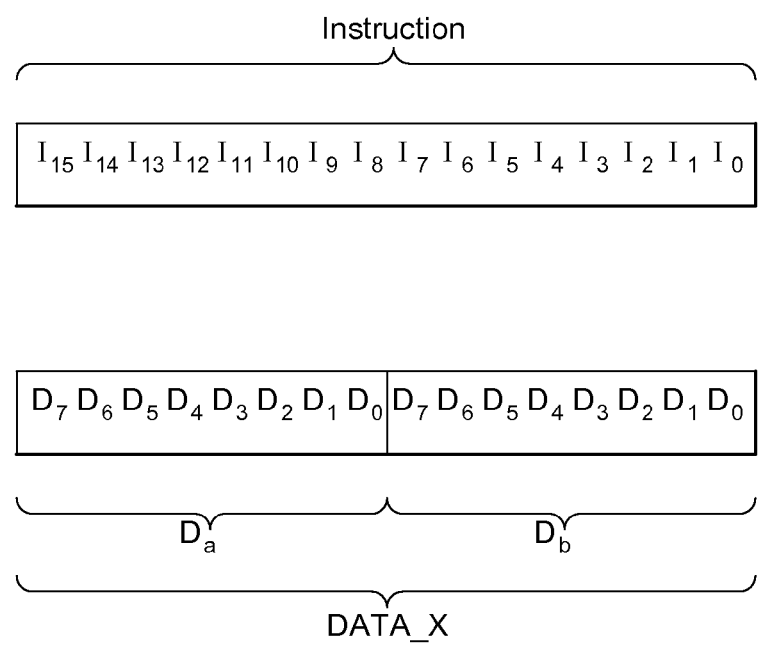
FIG. 3 shows the various possible memory sections contained in the shared memory according to this invention.

Shared memory 7 is divided into memory sections DATA_X, of identical size to the size of the instructions. Each memory section DATA_X can then include between 2 and 4 distinct data items depending upon the size of the instructions as shown in FIG. 3. Instructions coded in 16 bits and data coded in 8 bits will be taken here by way of example. Thus, each 16 bit memory section DATA_X includes two different 8 bit data items Da and Db.

When calculation unit 2 gives the order to read a data item Da, memory interface 8 takes the entire memory section DATA_X then masks the unwanted data Db so that only the desired data Da is read.

Further, the fact of passing through memory interface 8 increases the number of cycle times necessary for reading a data item or instruction compared to a conventional Harvard architecture. If this loss of time is negligible for reading a single data, it becomes significant when an entire table of data is read.

Consequently, this invention proposes to resolve this problem via management means 8 located between shared memory 7 and calculation unit 2. To do this, memory interface 8 uses buffer memory means 10, 11 for saving several data items. This buffer memory means 10, 11 includes a cache register and an address comparator 11. During reading of a data item Da, memory interface 8 will read data Da while saving the entire memory section DATA_X, in which Da is located, in cache register 10 as well as the corresponding address. Henceforth, if calculation unit 2 wishes to read the second data Db, address comparator 11 detects it noting that the address to be read is identical to the preceding one. Consequently, calculation unit 2 directly reads the memory section DATA_X stored in cache register 10 which means no time is wasted. Then, by masking data item Da, data Db is then usable by calculation unit 2. Once reading is completed, cache register 10 is deleted and will be replaced by the next section read.

This method using a cache register 10 and an address comparator 11 thus prevents memory interface 8 directly accessing shared memory 7 which saves time. For example, it is observed that, in the present case with instructions coded in 16 bits and data coded in 8 bits, a saving of 25% in cycle time is achieved. This saving may rise to 38% if instructions are coded in 32 bits and data is coded in 8 bits. Of course, cache register 10 is not limited to the same size as memory section DATA_X. Indeed, cache register 10 could have a larger storage capacity, for example allowing several consecutive memory sections DATA_X to be saved. The purpose of this is to improve reading of a table of data.

Further, it will be emphasised that if shared memory 7 is a non volatile or ROM memory, the possibility of not being obliged to have direct access to the memory to read data allows a reduction in electric power consumption.

It will be clear that various modifications and/or improvements and/or combinations evident to those skilled in the art can be made to the various embodiments of the invention set out above without departing from the scope of the invention defined by the annexed claims.

The invention claimed is:

1. A processor circuit, comprising:
a calculation unit;

a first memory element for storing data and a second memory element for storing instructions, said first and second memory elements being connected by at least one communication bus to the calculation unit; and management means placed between the first and second memory elements and the calculation unit and configured to save several data items or instructions to save time when successive data is read, wherein the management means includes buffer memory means for storing several data items, said buffer memory means including an address comparator for detecting whether the address of a memory section to be read is the same as that read previously so as to read directly in the buffer memory and save time, wherein the first and second memory elements form a single memory unit to form a shared memory type memory, and wherein the data and instructions are coded in a different number of bits and wherein the memory unit is divided into memory sections having a size equal to the larger size between the data and the instructions that have to be stored.

2. The processor circuit according to claim 1, wherein the buffer memory means includes a cache register.

3. The processor circuit according to claim 2, wherein the cache register has the same memory size as that of a memory section.

4. The processor circuit according to claim 1, wherein the data is coded in a smaller number of bits than the instructions.

5. The processor circuit according to claim 4, wherein the number of bits in which the data is coded is half the number of bits of the instructions.

6. The processor circuit according to claim 5, wherein the cache register has the same memory size as that of a memory section.

7. The processor circuit according to claim 4, wherein the cache register has the same memory size as that of a memory section.

8. The processor circuit according to claim 1, wherein the cache register has the same memory size as that of a memory section.

* * * * *